US011126950B2

(12) United States Patent
Barber et al.

(10) Patent No.: US 11,126,950 B2
(45) Date of Patent: Sep. 21, 2021

(54) SYSTEMS AND METHODS FOR VERIFYING THE CONTENTS OF A SHIPMENT

(71) Applicant: United Parcel Service of America, Inc., Atlanta, GA (US)

(72) Inventors: Jim Barber, Atlanta, GA (US); Jeffrey Cooper, Marietta, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 812 days.

(21) Appl. No.: 15/073,927

(22) Filed: Mar. 18, 2016

(65) Prior Publication Data

US 2016/0275441 A1 Sep. 22, 2016

Related U.S. Application Data

(60) Provisional application No. 62/135,083, filed on Mar. 18, 2015.

(51) Int. Cl.
*G06Q 10/08* (2012.01)
*G06K 9/62* (2006.01)
*G06T 7/00* (2017.01)

(52) U.S. Cl.
CPC ......... *G06Q 10/083* (2013.01); *G06K 9/6202* (2013.01); *G06T 7/001* (2013.01)

(58) Field of Classification Search
USPC .............................. 705/28, 24, 37, 330, 332
See application file for complete search history.

(56) References Cited

U.S. PATENT DOCUMENTS

| 5,600,700 A | 2/1997 | Krug et al. |
| 6,370,222 B1 | 4/2002 | Cornick, Jr. |
| 7,372,262 B2 | 5/2008 | Bertozzi et al. |
| 7,422,149 B2 | 9/2008 | Aptekar |
| 7,499,522 B2 | 3/2009 | Chen et al. |

(Continued)

FOREIGN PATENT DOCUMENTS

| CN | 1327249 A | 12/2001 |
| CN | 1653477 A | 8/2005 |

(Continued)

OTHER PUBLICATIONS

International Searching Authority, International Search Report and Written Opinion for International Application No. PCT/US2016/023052, dated May 2, 2016, 12 pages, European Patent Office, The Netherlands.

(Continued)

*Primary Examiner* — Akiba K Robinson
(74) *Attorney, Agent, or Firm* — Shook, Hardy & Bacon LLP

(57) ABSTRACT

Various embodiments are directed to systems and methods for verifying the content of shipments based at least in part on images representing the interior of the shipments generated by an imaging device. Embodiments comprise features for receiving shipment data identifying expected contents of a shipment, receiving image data comprising an image of an interior of the shipment, detecting one or more items in the image of the interior of the shipment, and determining whether the detected items match the expected content of the shipment.

20 Claims, 6 Drawing Sheets

(56) References Cited

U.S. PATENT DOCUMENTS

| | | |
|---|---|---|
| 7,613,618 B2 | 11/2009 | Dillon et al. |
| 7,669,764 B2 | 3/2010 | Dearing et al. |
| 7,689,465 B1 | 3/2010 | Shakes et al. |
| 7,899,232 B2 | 3/2011 | Gudmundson et al. |
| 8,146,814 B2 | 4/2012 | Mueller et al. |
| 8,322,044 B2 | 12/2012 | Gregory et al. |
| 8,381,976 B2 | 2/2013 | Mohideen et al. |
| 8,489,232 B2 | 7/2013 | Mishra et al. |
| 8,553,969 B1 | 10/2013 | Van De Vrande et al. |
| 8,596,546 B2 | 12/2013 | Learmonth et al. |
| 8,645,216 B2 | 2/2014 | Murphy et al. |
| 8,670,066 B2 | 3/2014 | Newcomb et al. |
| 8,861,816 B2 | 10/2014 | Lang et al. |
| 8,881,972 B2 | 11/2014 | O'Neill et al. |
| 8,885,914 B2 | 11/2014 | Kim |
| 8,923,603 B2 | 12/2014 | Weston et al. |
| 8,941,645 B2 | 1/2015 | Grimaud |
| 9,686,481 B1* | 6/2017 | Graybill .................. H04N 5/32 |
| 2002/0138374 A1 | 9/2002 | Jennings et al. |
| 2004/0182925 A1 | 9/2004 | Anderson et al. |
| 2004/0230439 A1 | 11/2004 | Aptekar |
| 2008/0306841 A1 | 12/2008 | Chang, II |
| 2011/0052049 A1 | 3/2011 | Rajaraman et al. |
| 2011/0175727 A1 | 7/2011 | Aikaterinidis |
| 2012/0170809 A1 | 7/2012 | Picazo Montoya |
| 2012/0201434 A1 | 8/2012 | Natali et al. |
| 2012/0311718 A1 | 12/2012 | McCarty |
| 2013/0088591 A1 | 4/2013 | Backlund |
| 2013/0101172 A1 | 4/2013 | Parikh et al. |
| 2013/0170732 A1 | 7/2013 | Gotou et al. |
| 2013/0341403 A1 | 12/2013 | Uebe et al. |
| 2014/0003655 A1 | 1/2014 | Gopalakrishnan et al. |
| 2014/0146169 A1 | 5/2014 | Ollivier et al. |
| 2014/0351073 A1 | 11/2014 | Murphy et al. |
| 2014/0358740 A1 | 12/2014 | Lipsey et al. |
| 2014/0379613 A1 | 12/2014 | Nishitani et al. |
| 2015/0063539 A1 | 3/2015 | Hayler et al. |
| 2015/0081581 A1 | 3/2015 | Gishen |
| 2015/0084987 A1 | 3/2015 | Hicks |
| 2015/0339862 A1* | 11/2015 | Skaaksrud ............. G06Q 10/08 382/101 |
| 2017/0132492 A1* | 5/2017 | Xie .................... G06F 16/50 |

FOREIGN PATENT DOCUMENTS

| | | |
|---|---|---|
| CN | 1327249 | 7/2007 |
| CN | 100334591 C | 8/2007 |
| CN | 100390709 C | 5/2008 |
| CN | 101305343 A | 11/2008 |
| CN | 100444187 C | 12/2008 |
| CN | 102799977 A | 11/2012 |
| CN | 103150641 A | 6/2013 |
| CN | 103917862 A | 7/2014 |
| EP | 2270547 | 5/2011 |
| EP | 2792853 A1 | 10/2014 |
| GB | 2330198 A | 4/1999 |
| JP | 2001-088912 A | 4/2001 |
| JP | 2011-098828 A | 5/2011 |
| JP | 2014-210646 A | 11/2014 |
| KR | 1290137 B1 | 7/2013 |
| KR | 2014-073834 A | 6/2014 |
| WO | 2001/046899 A2 | 6/2001 |
| WO | 2001/086581 A1 | 11/2001 |
| WO | 2004/072685 A1 | 8/2004 |
| WO | WO 2007/056420 A2 | 5/2007 |
| WO | WO 2007/122221 A1 | 11/2007 |
| WO | WO 2010/002853 A2 | 1/2010 |
| WO | WO 2013/102900 A1 | 7/2013 |
| WO | WO 2013/191282 A1 | 12/2013 |
| WO | WO 2014/199040 A1 | 12/2014 |

OTHER PUBLICATIONS

Communication pursuant to Article 94(3) EPC dated Feb. 7, 2019 in European Application No. 16713247.1, 7 pages.
Office Action received for Chinese Patent Application No. 201680016441.8, dated Mar. 13, 2020, 13 pages (7 pages of English Translation and 6 pages of Official copy).
Notice of Allowance received for Chinese Patent Application No. 201680016441.8, dated Nov. 5, 2020, 6 pages (2 pages of English Translation and 4 pages of Official copy).

* cited by examiner

SYSTEMS AND METHODS FOR VERIFYING THE CONTENTS OF A SHIPMENT

CROSS-REFERENCE TO RELATED APPLICATIONS

This patent application claims priority to Provisional Application Ser. No. 62/135,083, filed Mar. 18, 2015, which is incorporated herein by reference in its entirety.

BACKGROUND

Many carriers providing shipping services to transport shipments between a shipper and a consignee undertake such services with minimal information regarding the contents of the shipments. In many instances, shipments comprise items secured within non-descript packaging, such as unlabeled boxes, bags, crates, and/or the like, that provide only the minimal information necessary to inform carrier personnel of the ultimate destination for the shipment, as well as the expected speed with which the shipment is expected to arrive at its intended destination.

For certain shipments, such as those destined to be shipped across international borders, the shipper may provide a shipping manifest or other listing of items that are provided in the shipment. However, carriers are generally unable to verify the contents of the shipment without undertaking the time consuming process of physically unpacking and repacking the shipment. Moreover, unpacking and repacking shipments may significantly increase the risk that carrier employees may damage and/or lose various items that are shipped as a part of a shipment, thus subjecting the carrier to potential lost value claims by the shipper and/or the consignee. Moreover, unpacking and repacking shipments may be legally prohibited in certain jurisdictions, and accordingly carriers may be unable to legally undertake this process in order to verify the contents of items in the shipment.

Because carriers generally are unable to verify the contents of shipments, shippers and/or consignees may attempt to defraud the carrier when attempting to recoup the value of items that are lost and/or damaged during the transportation process. For example, shippers and/or consignees may report inflated values of lost and/or damaged items in order to obtain a reimbursement payment that is higher than the actual value of the lost and/or damaged item.

Accordingly, a need exists for systems and methods for verifying the content of shipments. Such systems and methods may thereby enable carriers to minimize opportunities for shippers and/or consignees to defraud the carrier, without substantially increasing the risk of damaging and/or losing various components of shipments.

BRIEF SUMMARY

Various embodiments are directed to a system for verifying the content of shipments. In various embodiments, the system comprises one or more memory storage areas and one or more processors. The one or more processors may be configured to receive shipment data corresponding to at least one shipment, wherein the shipment data is indicative of the expected content of the shipment; receive image data comprising an image of an interior of the shipment, wherein the image data is generated based at least in part on output of an imaging device imaging the shipment; detect one or more items represented in the image of the interior of the shipment; determine whether the detected one or more items matches the expected content of the shipment; and generate a graphical display indicative of whether the detected one or more items matches the expected content of the shipment.

Moreover, in various embodiments, the shipment data identifies an expected quantity of items within the shipment; and determining whether the detected one or more items matches the expected content of the shipment comprises determining whether a quantity of detected items represented in the image of the interior of the shipment satisfies an expected quantity of items within the shipment.

In various embodiments, the processors are additionally configured to receive reference image data comprising one or more reference images of one or more item types, wherein each reference image is associated with an item description; compare the detected one or more items represented in the image against the reference data; identify a matching reference image corresponding to one or more of the items detected in the image; associate the item description of the matching reference image with the corresponding item detected in the image; and determine whether the detected item description matches at least a portion of the expected content of the shipment. In various embodiments, the graphical display comprises the image of the interior of the shipment; and one or more of the reference images and the associated item descriptions. In various embodiments, the graphical display is configured to receive user input to associate one or more of the reference images with the image of the interior of the shipment.

In various embodiments, the imaging device comprises an X-ray imaging device. Moreover, detecting one or more items represented in the image of the interior of the shipment may comprise detecting the edges of each of the one or more items represented in the image.

In certain embodiments, the shipment data comprises one or more images of the expected content of the shipment; and determining whether the detected one or more items matches the expected content of the shipment comprises determining whether the detected one or more items matches one or more of the images stored in the shipment data. Moreover, the one or more processors may additionally be configured to generate a notification indicative of whether the detected one or more items matches the expected content of the shipment. In various embodiments, the shipment data identifies a disposition criteria for determining whether the detected one or more items matches the expected content of the shipment. Moreover, the disposition criteria may be selected from: (1) determining whether the number of items detected in the image matches an expected number of items; or (2) determining whether an identified item description corresponding to at least one of the items detected in the image matches an expected item description.

Certain embodiments are directed to a computer-implemented method for verifying the content of shipments. The method may comprise steps for: receiving, via one or more processors, shipment data corresponding to at least one shipment, wherein the shipment data is indicative of the expected content of the shipment; receiving, via the one or more processors, image data comprising an image of an interior of the shipment, wherein the image data is generated based at least in part on output of an imaging device imaging the shipment; detecting, via the one or more processors, one or more items represented in the image of the interior of the shipment; determining, via the one or more processors, whether the detected one or more items matches the expected content of the shipment; and generating, via a graphical display device, a graphical display indicative of whether the detected one or more items matches the expected content of the shipment.

In certain embodiments, the shipment data identifies an expected quantity of items within the shipment; and determining whether the detected one or more items matches the expected content of the shipment comprises determining whether a quantity of detected items represented in the image of the interior of the shipment satisfies an expected quantity of items within the shipment.

In various embodiments, the method additionally comprises steps for receiving reference image data comprising one or more reference images of one or more item types, wherein each reference image is associated with an item description; comparing the detected one or more items represented in the image against the reference data; identifying a matching reference image corresponding to one or more of the items detected in the image; associating the item description of the matching reference image with the corresponding item detected in the image; and determining whether the detected item description matches at least a portion of the expected content of the shipment.

Certain embodiments are directed to a system for verifying the content of shipments, comprising: one or more memory storage areas; and one or more processors. In various embodiments, the one or more processors are configured to receive first image data comprising a first image of an interior of a shipment, wherein the first image data is generated based at least in part on output of an imaging device imaging the shipment; receive second image data comprising a second image of the interior of the shipment, wherein the second image data is generated based at least in part on output of an imaging device imaging the shipment after the first image data is generated; detect one or more first items represented in the first image of the interior of the shipment; detect one or more second items represented in the second image of the interior of the shipment; and determine whether the one or more first items match the one or more second items.

In various embodiments, determining whether the one or more first items match the one or more second items comprises determining whether the quantity of first items is the same as quantity of second items. In yet other embodiments, the one or more processors are further configured to: receive reference image data comprising one or more reference images of one or more item types, wherein each reference image is associated with an item description; compare the detected one or more first items represented in the first image against the reference data; identify a matching reference image corresponding to one or more of the first items detected in the first image; associate the item description of the matching reference image with the corresponding first item detected in the first image; compare the detected one or more second items represented in the second image against the reference data; identify a matching reference image corresponding to one or more of the second items detected in the second image; associate the item description of the matching reference image with the corresponding second item detected in the second image; and determine whether the detected item description of the one or more first items is the same as the detected item description of the one or more second items.

In various embodiments, the imaging device comprises an X-ray imaging device. Moreover, detecting one or more first items represented in the first image of the interior of the shipment may comprise detecting the edges of each of the one or more first items represented in the first image; and detecting one or more second items represented in the second image of the interior of the shipment may comprise detecting the edges of each of the one or more second items represented in the second image. In yet other embodiments, the one or more processors are further configured to generate a notification indicative of whether the one or more first items match the one or more second items.

Various embodiments are directed to a computer-implemented method for verifying the content of shipments. In various embodiments, the method comprising steps for: receiving, via one or more processors, first image data comprising a first image of an interior of a shipment, wherein the first image data is generated based at least in part on output of an imaging device imaging the shipment; receiving, via the one or more processors, second image data comprising a second image of the interior of the shipment, wherein the second image data is generated based at least in part on output of an imaging device imaging the shipment after the first image data is generated; detecting, via the one or more processors, one or more first items represented in the first image of the interior of the shipment; detecting, via the one or more processors, one or more second items represented in the second image of the interior of the shipment; and determining, via the one or more processors, whether the one or more first items match the one or more second items.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
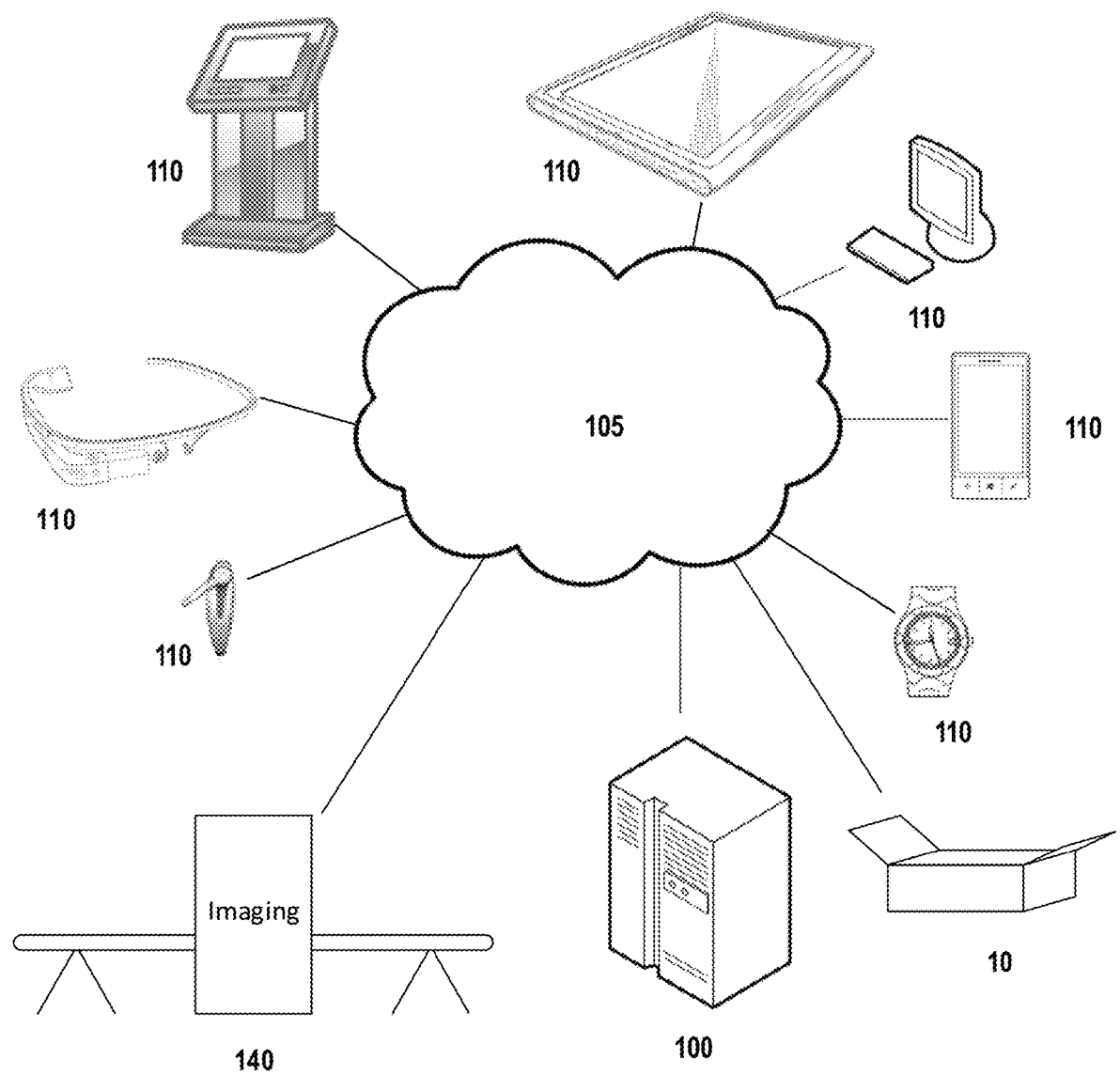
FIG. 1 is an overview of a system that can be used to practice embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Generally, a shipper (or a 3rd party servicer) may deposit one or more items into one or more package(s) to form a shipment for delivery to a consignee by a carrier. In some embodiments, the shipper (or a 3rd party servicer) captures one or more image(s) of the item(s) before and/or after packaging via one or more imaging devices. The term "image" should be interpreted broadly to include any type of representation of the item(s), such as for example a digital image, an X-ray, an ultrasound, thermal image, or any other type of imaging. These images may then be sent physically, electronically or otherwise made available to a carrier or a 3rd party (e.g., to a carrier computing entity 100). For example, the images may be sent from a user computing entity 110 to a carrier computing entity 100.

In various embodiments, the carrier may ingest the shipment into a package delivery network. Additionally, a carrier computer system (e.g., carrier computing entity 100) may ingest the image(s) of the item(s) and associate the images with other shipping related data such as shipper address data, consignee address data, description of the goods, tracking numbers, service levels, value, brokerage documents and/or the like. This shipping related data may be generated by the carrier and/or by the shipper, and provided to the carrier computing entity 100. In some embodiments, the carrier may receive shipping related data (e.g., via the carrier computing entity 100) but may not receive images in association with the item(s) being shipped.

In various embodiments, the carrier (or a 3rd party servicer) captures one or more images of the item(s) (e.g., via an imaging device). The term "image" should be interpreted broadly to include any type of representation of the item(s), such as for example a digital image, an X-ray, an ultrasound, thermal image, or any other type of imaging. The images of the item(s) may be captured with or without the packaging (e.g., while the item(s) remain in the packaging and/or while the item is removed from the packaging). In a non-limiting example, an X-Ray image may be taken without opening the packaging. In another non-limiting example, the carrier may open a package to capture a digital image of one or more item(s) within the package. In various embodiments, the imaging device and/or a user computing entity 110 may transmit the images to the carrier computing entity 100.

In various embodiments, the carrier (or a 3rd party servicer) may analyze the data (e.g., via the carrier computing entity 100) associated with the shipment to identify the contents and an expected image of the items within the shipment. In some embodiments, the carrier computer system (e.g., carrier computing entity 100) (or a 3rd party servicer computer system) may compare the description of items against a database comprising a list of items with associated reference images. For example, the description of items may indicate that the items are baseball bats which would then be compared against the list of items in the database to identify one or more reference images of a baseball bat (e.g., an expected image). In some embodiments, the database may include one or more images from multiple different imaging techniques and the carrier computer system (or a 3rd party servicer computer system) may identify the type of image captured by or to be captured by the carrier or third party servicer via an imaging device (e.g., X-ray, ultrasound, thermal, etc.) so that the appropriate expected image can be retrieved. In other embodiments, the consignee or a 3rd party may provide one or more expected images of the goods to the carrier (or a 3rd party servicer).

After an expected image is identified/provided, the image captured by the carrier (or a 3rd party servicer) may be compared against the expected image to verify the contents of the shipment. If there is a match, the shipment may proceed for delivery. If there is no match, the shipment may be directed to a staging area for further review. It should be understood that a match does not have to be exact. Some predetermined tolerance may be established to qualify as a match. In some embodiments, the analysis may confirm the number of items in the shipment. For example, if the description of items indicates 99 baseball bats, the comparison of the expected image and the captured image may identify the number of matches.

In various embodiments, the results of the comparison analysis may be shared with other parties, such as, for example government agencies, financial institutions, insurers, parties to the transaction, etc. For example, notifications may be sent when a match is found or when a match is not found.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAIVI), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and/or flowchart illustrations. Thus, it should be understood that each block of the block diagrams and/or flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more carrier computing entities 100, one or more networks 105, one or more user computing entities 110, one or more imaging devices 140, one or more shipments 10, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entities

Figure 2:
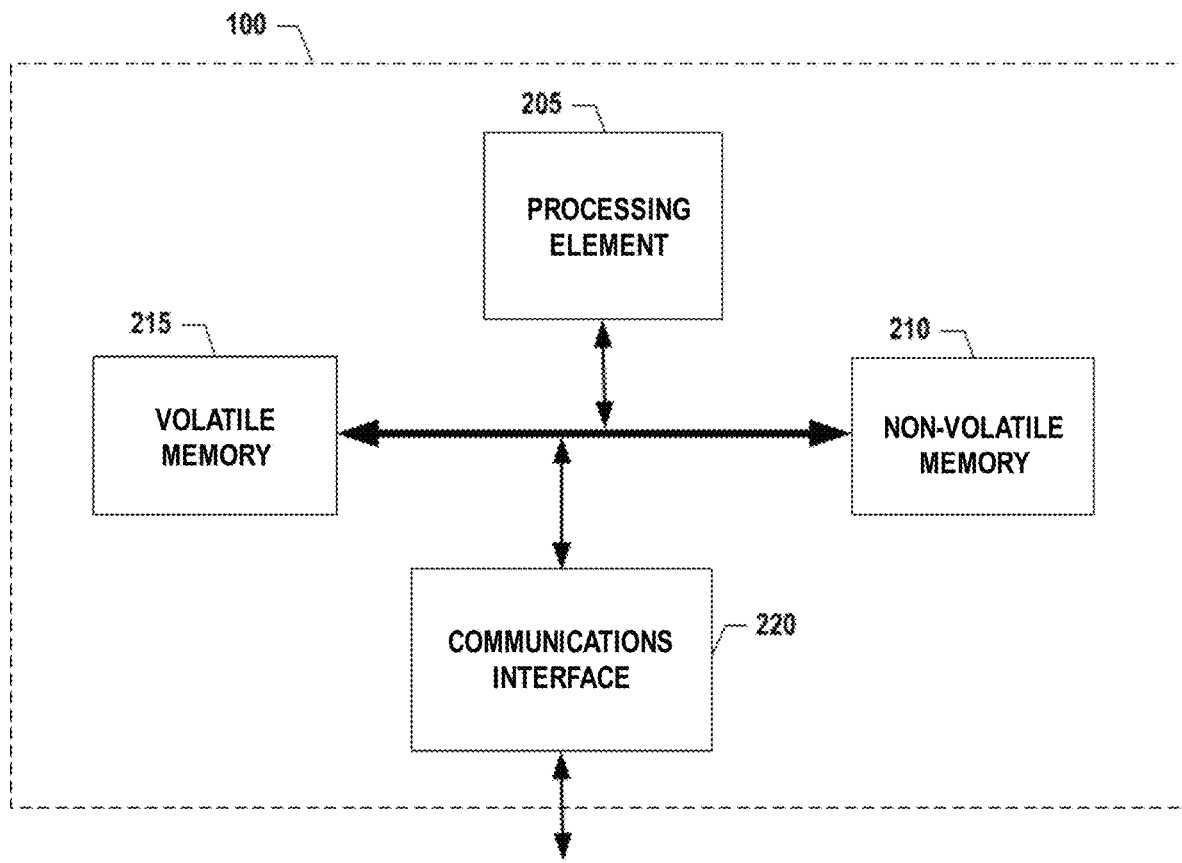
FIG. 2 is an exemplary schematic diagram of a carrier computing entity according to one embodiment of the present invention.

FIG. 2 provides a schematic of a carrier computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOC SIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

In one embodiment, the carrier computing entity 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
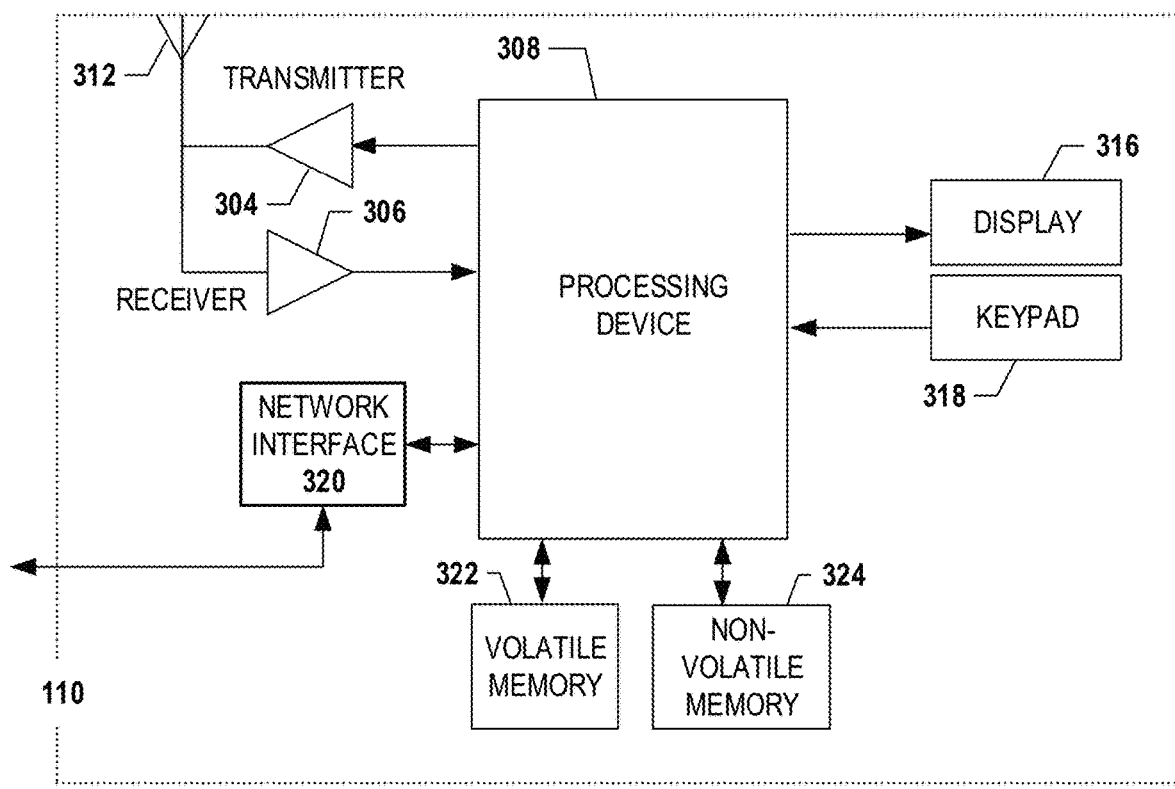
FIG. 3 is an exemplary schematic diagram of a user computing entity according to one embodiment of the present invention.

A user may be an individual, a family, a company, an organization, an entity, a department within an organization, a representative of an organization and/or person, and/or the like—whether or not associated with a carrier. To do so, a user may operate a user computing entity 110 that may include one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

3. Exemplary Imaging System

In various embodiments, the system may additionally comprise an imaging device 140 to image the contents of various shipments. The imaging device 140 may comprise an X-ray imaging device, a millimeter wave imaging device, a Magnetic Resonance Imaging (MRI) imaging device, a computerized tomography (CT) imaging device, an ultrasound imaging device, an infrared imaging device, and/or the like.

For example, the imaging device may comprise an X-ray imaging device configured to transmit X-ray radiation through and/or scattered from items within shipments. In general, X-ray radiation may comprise electromagnetic waves having a wavelength between 0.01 and 10 nanometers. Such electromagnetic waves propagate from an X-ray emitter through the shipment to be imaged, and are collected by a detector positioned opposite the shipment to be imaged from the X-ray emitter, the detector comprising one or more detector elements configured to measure the intensity of the transmitted radiation (i.e., the electromagnetic wave) along a radiation ray projected from the X-ray emitter to a detector element. In various embodiments, the one or more detector elements may comprise solid-state detectors generally utilized for digital imaging. The solid-state detectors may comprise a luminescent conversion layer, for example, a scintillator (e.g., a cesium iodide scintillator) in which the radiation received by the solid-state detector causes the scintillator to generate light pulses, which may subsequently be converted into digital signals that may be transmitted to a user device and displayed via a display device.

Figure 4B:
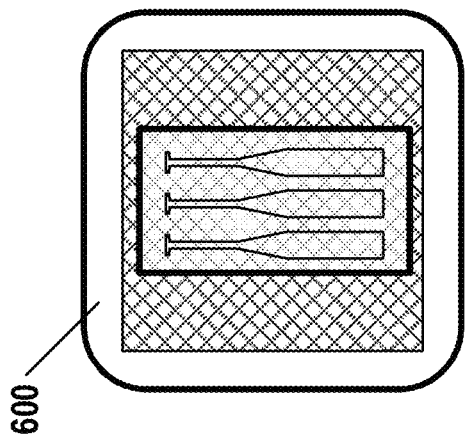
FIG. 4B is an exemplary image of a shipment generated by an imaging device according to one embodiment of the present invention.
Figure 4A:
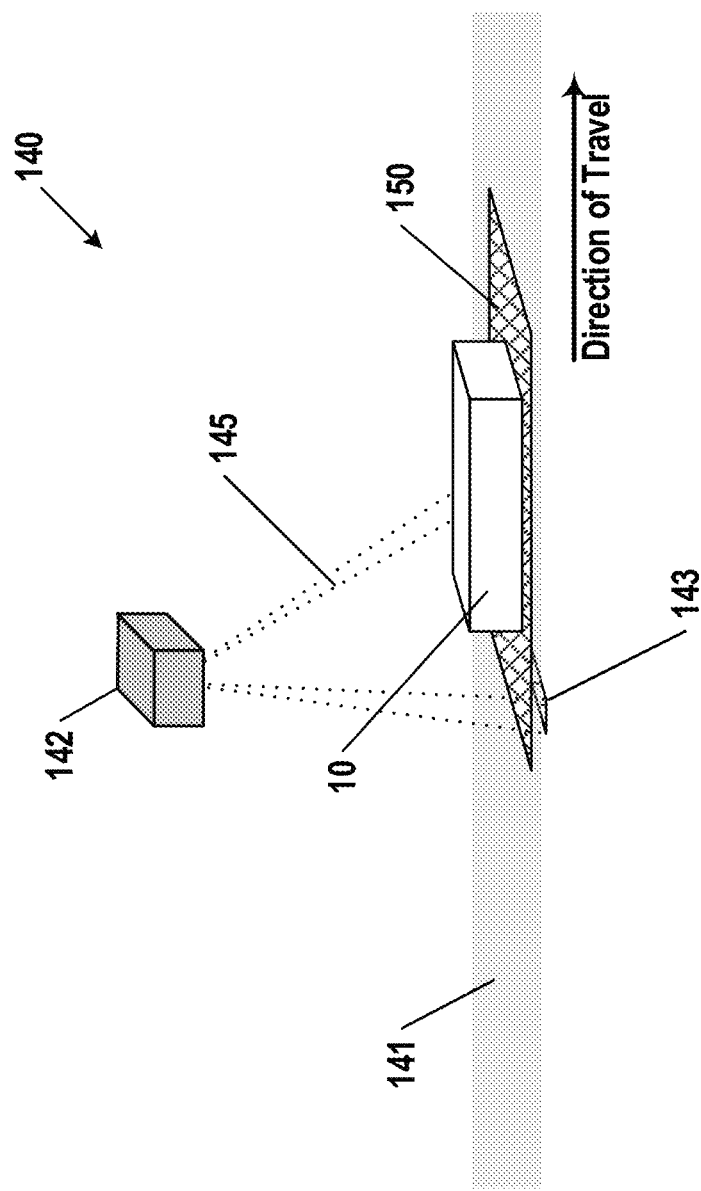
FIG. 4A is an exemplary schematic diagram of an imaging device according to one embodiment of the present invention.

An example imaging device 140 is illustrated in FIG. 4A, and an example generated image is shown in FIG. 4B. As shown in FIG. 4A, the imaging device 140 may be configured to image one or more shipments 10 while the shipment is being propelled by the conveying mechanism 141. Although illustrated as a conveyor belt, the conveying mechanism 141 may comprise any of a plurality of conveying mechanisms, such as, for example, a slide, chute, bottle conveyor, open or enclosed track conveyor, I-beam conveyor, cleated conveyor, and/or the like.

Moreover, various embodiments may comprise a penetration grid 150 configured to facilitate a determination of whether an imaging signal has fully penetrated a shipment 10 to be imaged. In various embodiments, the penetration grid 150 may be placed between an imaging emitter 142 and a detector element 143, such that the emitted imaging signals 145 (e.g., X-ray beams) may pass through both the shipment 10 to be imaged and the penetration grid 150 before reaching the detector. For particularly densely packed shipments, it is important that imaging signals 145 (e.g., X-ray radiation) emitted by an imaging emitter 143 (e.g., an X-ray imaging device) penetrate the entirety of the imaged shipment so as to provide a desired degree of certainty that the shipment has been entirely imaged. Penetration grids 150 comprising mesh or grid structures (such as those described in U.S. patent application Ser. No. 14/475,986, filed Sep. 3, 2014, the contents of which are incorporated herein by reference in its entirety), have proven helpful in this regard by placing such penetration grid 150 adjacent the shipment 10, opposite a directional orientation of the imaging device 140. In this manner, such mesh or grid structures provide a baseline indicator of penetration, for example such that if the mesh or grid is visible within a generated image, the shipment 10 has been sufficiently penetrated with the imaging signals.

4. Exemplary Shipment

In one embodiment, a shipment 10 may be any tangible and/or physical object. In one embodiment, a shipment 10 may comprise one or more items enclosed in one or more packages, envelopes, parcels, bags, goods, products, containers, loads, crates, items banded together, vehicle parts, pallets, drums, the like, and/or similar words used herein interchangeably. In one embodiment, each shipment 10 may include and/or be associated with a shipment identifier, such as an alphanumeric identifier, and as discussed herein, a shipment profile. The shipment identifiers may be represented as text, barcodes, tags, character strings, Aztec Codes, MaxiCodes, information/data Matrices, Quick Response (QR) Codes, electronic representations, and/or the like. A unique shipment identifier (e.g., 123456789) may be used by the carrier to identify and track the shipment 10 as it moves through the carrier's transportation network. Further, such shipment identifiers can be affixed to shipments by, for example, using a sticker (e.g., label) with the unique shipment identifier printed thereon (in human and/or machine readable form) or an RFID tag with the unique shipment identifier stored therein. Such shipments may be referred to as "connected" shipments 10 and/or "non-connected" shipments 10.

In one embodiment, connected shipments include the ability to determine their locations and/or communicate with various computing entities. This may include the shipment being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected shipments may include one or more components that are functionally similar to those of the carrier server 100 and/or the mobile device 110 as described herein. For example, in one embodiment, each connected shipment may include one or more processing elements, one or more display device/input devices (e.g., including user interfaces), volatile and non-volatile storage or memory, and/or one or more communications interfaces. In this regard, in some example embodiments, a shipment may communicate send "to" address information/data, received "from" address information/data, unique identifier codes, location information/data, status information/data, and/or various other information/data.

In one embodiment, non-connected shipments do not typically include the ability to determine their locations and/or might not be able communicate with various computing entities or are not designated to do so by the carrier. The location of non-connected shipments can be determined with the aid of other appropriate computing entities. For example, non-connected shipments can be scanned (e.g., affixed barcodes, RFID tags, and/or the like) or have the containers or vehicles in which they are located scanned or located. As will be recognized, an actual scan or location determination of a shipment is not necessarily required to determine the location of a shipment. That is, a scanning operation might not actually be performed on a label affixed directly to a shipment or location determination might not be made specifically for or by a shipment. For example, a label on a larger container housing many shipments can be scanned, and by association, the location of the shipments housed within the container are considered to be located in the container at the scanned location. Similarly, the location of a vehicle transporting many shipments can be determined, and by association, the location of the shipments being transported by the vehicle are considered to be located in the vehicle at the determined location. These can be referred to as "logical" scans/determinations or "virtual" scans/determinations. Thus, the location of the shipments is based on the assumption they are within the container or vehicle, despite the fact that one or more of such shipments might not actually be there.

III. EXEMPLARY SYSTEM OPERATION

As discussed herein, various embodiments may be directed to systems and methods for determining and/or verifying the contents of a shipment being transported by a carrier. Accordingly, various embodiments may receive and store data indicative of an expected content of a shipment, as well as additional information regarding the particular shipment. Such information may be stored in a generated shipment profile, which may additionally include information received and/or generated while the shipment is en route between an origin and a destination. In various embodiments, the shipment profile may comprise data indicative of a prescribed review procedure for the shipment. The review procedure prescribed for a particular shipment may be indicative of a disposition criteria to be utilized to determine an appropriate disposition for the package based on the results of the review procedure.

Various embodiments may undertake an analysis of the shipment in accordance with the prescribed review procedure for the shipment, which may comprise imaging the shipment with an imaging method (e.g., an X-ray imaging process) and/or other methodology for identifying items within a shipment, detecting various items within the shipment, identifying each of the detected items within the shipment, and determining whether the identified items satisfy one or more disposition criteria for dispensing with the shipment.

1. Establishing a Shipment Profile

In various embodiments, a shipment profile may be established for each of a plurality of shipments 10. The shipment profile may comprise data indicative of various attributes of the corresponding shipment 10, and may be stored within one or more databases accessible to the carrier server 100. In various embodiments, the shipment profile may be generated by, for example, the carrier server 100 upon receipt of data identifying one or more shipments (e.g., a shipment identifier). The shipment profile may be stored within the database during the period of time that the shipment 10 is in the possession of the carrier, while the carrier is transporting the shipment 10 from an origin to a destination. In various embodiments, the shipment profile may be stored within the database for a period of time (e.g., one year) after the completion of the transportation process of the shipment 10 from the origin to the destination, or may be deleted upon receipt of data indicating that the shipment 10 has been delivered to the destination. In various embodiments, the profile may be stored within the database until receiving a notification from the shipper, the consignee, a third-party entity (e.g., an insurance provider), and/or the like requesting that the shipment profile be deleted.

The shipment profile corresponding to a particular shipment 10 may comprise a variety of data indicative of various attributes of the shipment 10. For example, the shipment profile may comprise shipment identification data, such as a shipment identifier (e.g., an alphanumeric string, a bar code, MaxiCode, QR Code, and/or the like), a destination location (e.g., a destination address), an origin location (e.g., an origin address), an intended recipient (e.g., the name of the entity intended to receive the shipment), a shipper (e.g., the name of the entity providing the shipment for shipment by the carrier), a service level (e.g., Ground, Next-Day Air, 2-Day Air, 3-Day Ground, and/or the like), an insured value, a listing of items included in the shipment 10 (e.g., a shipping manifest, itemized invoice, financing documents, insurance claim forms, and/or the like), and/or the like. Moreover, in various embodiments, the shipment profile corresponding to a particular shipment 10 may comprise one or more images of items included in the shipment 10 (e.g., a photograph of one or more items (e.g., one or more items representative of the contents of the shipment); an X-ray image of the one or more shipments and/or one or more items included in the one or more shipments (e.g., one or more items representative of the contents of the shipment), a Millimeter-wave image of the one or more shipments and/or one or more items included in the one or more shipments (e.g., one or more items representative of the contents of the shipment), a CT image of the one or more shipments and/or one or more items included in the one or more shipments (e.g., one or more items representative of the contents of the shipment), and/or the like). In various embodiments, the shipment profile may comprise images of items included in the shipment 10 taken at various times throughout the shipment process. For example, the shipment profile may comprise images provided to the carrier by the shipper of various items, images taken by the carrier upon receipt of the shipment 10 (e.g., an X-ray image generated at a receiving location at which the carrier accepts the shipment 10 into the carrier's shipment network), images taken by the carrier at various times while the shipment 10 is transported from the origin to the destination (e.g., images taken at one or more shipping hubs through which the shipment 10 is transported during the shipping process, images taken at one or more airports, images taken at one or more international ports, and/or the like), images taken by the carrier immediately before the carrier delivers the shipment 10 to its intended destination, and/or the like.

To populate at least a portion of the data stored for a particular shipment profile, the one or more carrier servers 100 may access Package Level Detail ("PLD") information/data maintained by the carrier. As will be understood by those skilled in the art, carriers may maintain PLD information/data for each of the shipments that are forecasted to be delivered by the delivery network. This dynamic information/data may include information/data for each forecasted shipment such as a ship date, an origin location indicia (e.g., an origin street address), destination location indicia (e.g., a destination street address), service level, a forecasted delivery date, a unique identifier, and exception information.

Moreover, in various embodiments, the shipment profile may comprise data indicative of a review procedure prescribed to the corresponding shipment 10. As will be described in greater detail herein, various review procedures, each having different included enhanced review processes, may be instituted by a carrier, and accordingly the shipment profile may provide an indication of a particular review procedure prescribed for the shipment. In various embodiments, the shipment profile may comprise data indicative of an alphanumeric string, a bar code, MaxiCode, QR code, and/or the like that may be indicative of a particular review procedure prescribed for the shipment 10.

In various embodiments, the data identifying the review procedure prescribed for a particular shipment 10 may be provided to the carrier server 100 (and subsequently stored in the database as a portion of the shipment profile) as user input (e.g., received by one or more remote computing entities 110). For example, the carrier server 100 may be configured to provide a user interface requesting various information identifying a particular shipment 10 (e.g., during a shipment intake process), and the user interface may request entry of data identifying a particular review procedure prescribed for the shipment 10. As discussed herein, the carrier server 100 may be configured to determine an appropriate review procedure based on data stored in the shipment profile and/or historical data associated with a shipper, a destination location, an origin location, and/or the like.

In various embodiments, an identifier tag may be generated for a shipment 10 identifying the corresponding shipment profile. The generated identifier tag may comprise machine readable and/or human-readable identifiers (e.g., an alphanumeric string, a colored label, a bar code, MaxiCode, QR code, RFID tag (e.g., active or passive), and/or the like) that may be placed on or in the shipment 10 to identify the corresponding shipment profile, such that data identifying the prescribed review procedure may be accessed during shipment. As a specific example, a colored label may be placed on the shipment 10 that may serve to provide a visual indicator of an appropriate review procedure to users (e.g., carrier personnel), and may provide data to the carrier server 100 indicative of the appropriate review procedure for the shipment 10. Following this example, a red label may correspond to a first review procedure, a blue label may correspond to a second review procedure, a green label may correspond to a third review procedure, and/or the like. In various embodiments, the identifier may provide additional information to users and/or the carrier server 100, such as a preferred imaging orientation, as described in detail herein. In various embodiments, the label may be radiopaque or otherwise visible in images taken of the shipment 10. Accordingly, the generated images, which include representations of the label therein, may provide an indication that the images were taken utilizing a prescribed shipment orientation.

In various embodiments, the shipment profile may additionally comprise additional data associated with the shipment 10. For example, the shipment profile may comprise data indicative of a reputation of a destination location, a reputation of a shipper, one or more unique identifiers corresponding to the shipper and/or intended recipient, and/or the like. As discussed herein, such data may be identified by the carrier server 100 based on data stored in association with one or more shipment profiles. Accordingly, upon the carrier server 100 determining relevant information for one or more shipments 10, the carrier server 100 may be configured to update the shipment profile to include the determined relevant information in order to decrease relevant processing resources necessary to determine the same relevant information at a later time.

Moreover, the shipment profiles may comprise data indicative of imaging instructions for the corresponding shipment 10. For example, the shipment profiles may comprise data indicative of a preferred shipment orientation during the imaging process (e.g., the orientation of the shipment 10 relative to one or more components of an imaging device). For example, the shipment profile may indicate that a shipping label of a particular shipment 10 should be placed facing upwards while the shipment 10 is placed onto an imaging device. In such embodiments, the data stored in the shipment profile facilitates consistent imaging orientation, such that images from subsequent imaging processes may be compared relative to one another.

a. Determining an Appropriate Review Procedure Based on Shipment Data

In various embodiments, the carrier server 100 may be configured to determine an appropriate review procedure to be prescribed for a shipment 10 based at least in part on data stored in the shipment profile (e.g., shipment identification data). In various embodiments, the carrier server 100 may determine an appropriate review procedure for a particular shipment 10 based on data identifying the shipper, the recipient, the origin location, the destination location, the expected contents, the insured value, the size, the weight, and/or the like.

For example, identified high-risk shipments 10 (e.g., shipments originating from shippers identified as high-risk, shipments destined for destinations identified as high-risk, shipments passing geographical areas and/or sort locations identified as high-risk, and/or shipments having particular high-risk contents), high value shipments 10 (e.g., shipments having an insured value greater than a specified threshold), shipments specifically identified by one or more entities (e.g., shippers, third-party entities (e.g., insurance providers), and/or the like), shipments received with corresponding images, shipments for which one or more corresponding document is identified as being incorrect and/or as containing a discrepancy (e.g., a shipping manifest having a listing of items different from a corresponding invoice, a shipping manifest indicating the shipment has an incorrect weight, based on a comparison to a determined weight, a shipment having a declared value different from an estimated value determined based on the identified contents, and/or the like), and/or the like may be assigned a stringent review procedure for determining and/or verifying the contents of the shipment 10, including one or more enhanced review processes, as discussed herein. As yet other examples, shipments may be periodically selected for a more stringent review in order to provide periodic audits of the review procedure. For example, shipments which do not satisfy other criteria for qualifying for a stringent review may be selected randomly and/or based on a periodic review schedule (e.g., every fifth package received by a carrier, every tenth package received by a carrier, every one-hundredth package received by a carrier, and/or the like). Other shipments 10 may be prescribed less stringent review procedures, as discussed in greater detail herein.

In various embodiments, a prescribed review procedure may be determined based on data identifying one or more insured value thresholds for determining an appropriate review procedure, data indicating that shipments having particular service levels should be assigned a particular review procedure, data indicating that shipments containing one or more predefined items should be assigned a particular review procedure, and/or the like. For example, the carrier server 100 may be configured to assign a first review procedure to shipments having an insured value that satisfies a particular threshold. As a specific example, a carrier server 100 may be configured to assign a more stringent review procedure to shipments having an insured value above a threshold value (e.g., $5,000) as compared to the review procedure prescribed for other shipments.

As yet other examples, an appropriate review procedure may be determined based on various characteristics of the shipment 10 itself. In various embodiments, an appropriate review procedure for a particular shipment may be determined based on the size of the shipment (e.g., length, width, and/or height), the weight of the shipment, and/or the contents of the shipment. For example, shipments that exceed a particular size threshold (e.g., a dimensional weight threshold) and/or a particular weight threshold may be assigned a particular review procedure. Moreover, an appropriate review procedure for a particular shipment may be determined based at least in part on the contents and/or configuration of the shipment 10. For example, shipments containing hazardous materials, dry ice, irregularly shaped items, fragile items, and/or the like may be prescribed a particular review procedure. As yet other examples, the appropriate review procedure may be prescribed for a particular shipment upon a determination that the shipment contains items that may be damaged if subject to particular enhanced review process. For example, shipments containing film, cameras, and/or the like may be identified as ineligible for any enhanced review process utilizing X-ray imaging, and accordingly, an appropriate review procedure for such shipments may omit various enhanced review processes utilizing X-ray imaging.

In various embodiments, the determination of an appropriate review procedure may be made based on a plurality of attributes of the shipment 10. For example, an appropriate review procedure for a particular shipment may be determined based on a review of an expected content of the shipment (e.g., as determined based on an included listing of the contents of the shipment), and upon a determination of whether a weight of the shipment is consistent with an estimated weight of the shipment containing the expected contents. For example, in various embodiments, the carrier server 100 may be configured to determine an expected weight (e.g., an estimated weight having an associated tolerance, a range of acceptable weights, and/or the like) for a shipment based on a listing of the contents of the shipment. In various embodiments, the expected weight may provide for variations in an actual weight of the contained items as well as an allowance for differences in packaging material weight. As a specific example, the carrier server 100 may be configured to determine an expected weight of a shipment of 99 adult-sized baseball bats is between approximately 180 pounds and 250 pounds (determined based in part on expected potential differences in weight for each baseball bat, as well as an allowance for packaging materials utilized within the shipment). Upon a determination that the weight of the shipment does not correspond to the expected weight (e.g., the actual weight is substantially higher or substantially lower than the expected weight), the carrier server 100 may be configured to prescribe a particular review procedure to the shipment (e.g., a more stringent review procedure than would otherwise be prescribed for a shipment containing 99 baseball bats). In various embodiments, the carrier server 100 may be in communication with one or more databases providing data regarding expected weights of various items, and accordingly the carrier server 100 may be configured to determine an expected weight of a shipment based at least in part on the expected quantity of each type of item included in the shipment, an estimated weight or range of weights associated with the item, and/or an allowance for a weight of packaging materials utilized to package the item, as stored in the database. The database may be private, such that only carrier users and/or the carrier sever 100 may access the data stored therein, or the database may be publicly accessible. In various embodiments, the database comprising weight data may be managed by a third party (e.g., the shipper, the intended recipient, and/or another third party) and may be accessible by the carrier server 100. As a non-limiting example, the carrier server 100 may be configured to access estimated weight data from a product listing on a webpage provided by a shipper.

b. Determining an Appropriate Review Procedure Based on Historical Data

In various embodiments, the appropriate review procedure may be determined based on historical data identified based at least in part on information specific to a particular shipment. For example, historical data indicative of a stop reputation for the intended destination location may be stored in one or more databases accessible to the carrier server 100. The stop reputation may include information/data regarding missed deliveries, claims, delinquencies, etc. associated with historical shipments intended to be delivered to the intended destination of the shipment. Similar information indicative of a shipper reputation may be stored in a database, wherein the shipper reputation may include information/data regarding missed deliveries, claims, delinquencies, etc. associated with historical shipments originating from a particular shipper and/or shipper location. For example, the stop reputation and/or shipper reputation may indicate that a particular shipment is originating from and/or destined for delivery to a high-crime area, a particular geographical region identified as high-risk by the carrier, and/or the like.

In various embodiments, the review procedure for a particular shipment may be determined based on characteristics of the destination for the shipment. For example, the carrier server 100 may assign a particular review procedure (e.g., a high review procedure) to shipments destined for identified destination locations, destination locations within identified postal codes, destination locations serviced by particular carrier hubs, destination locations within identified neighborhoods, and/or the like. For example, shipments scheduled to be shipped to a recipient and/or destination that has not received previous deliveries may be assigned a more stringent review procedure. Similarly, shipments scheduled to be shipped from a shipper and/or an origin location that has not previously shipped shipments may be assigned a more stringent review procedure.

In various embodiments, particular destination locations, shippers, and/or shipper locations may be associated with a particular review procedure (e.g., a stringent review procedure) only temporarily, such that shipments associated with the particular destination locations, shippers, and/or shipper locations may be subject to the prescribed review procedure if, for example, the shipment is shipped during the temporary period of time. However, certain destination locations, shippers, and/or shipper locations may be associated with prescribed review procedures permanently.

For example, one or more postal codes may have a prescribed review procedure due to the recent occurrence of riots and/or looting within the postal codes. During the period of time that riots and/or looting are identified as occurring, shipments destined to the identified postal codes may be subject to a stringent review procedure to verify the contents of shipments in case of increased insurance claims due to lost and/or damaged shipments, and/or the verify that the shipments do not contain contraband.

As discussed herein, a review procedure for a shipment may be determined based on characteristics of the origin for the shipment. For example, shipments originating from certain locations (e.g., cities, towns, warehouses, buildings, and/or the like) may be identified as high-risk shipments, and accordingly these shipments may be subject to a prescribed review procedure. Moreover, shipments originating from certain identified shippers/consignors may be associated with a particular review procedure. For example, one or more shippers may have indicated a desired review procedure to be performed for shipments originating from that shipper.

In various embodiments, a review procedure for a shipment may be determined based on a comparison between characteristics of the shipment and characteristics of historical shipments containing the same or similar items. For example, upon a determination that one or more characteristics (e.g., a weight) for a particular shipment differ from characteristics for historical shipments containing the same and/or similar items, a particular review procedure may be selected for the particular shipment.

2. Reviewing a Shipment

As discussed herein, at one or more instances during which the shipment 10 is possessed by the carrier (e.g., during transportation from an origin to a destination for the shipment), the carrier may undertake various enhanced review processes for the shipment 10. In various embodiments, various combinations of these enhanced review processes may collectively define various review procedures for the shipment. Moreover, the appropriate review procedure (and accordingly the corresponding enhanced review processes to be applied to a particular shipment) may be identified within the shipment profile corresponding to a particular shipment 10. For example, the shipment profile may be stored in association with a review procedure identifier (e.g., an alphanumeric string, a bar code, Maxi-Code, QR code, and/or the like) indicative of a prescribed review procedure to be performed for a particular shipment 10.

Figure 5:
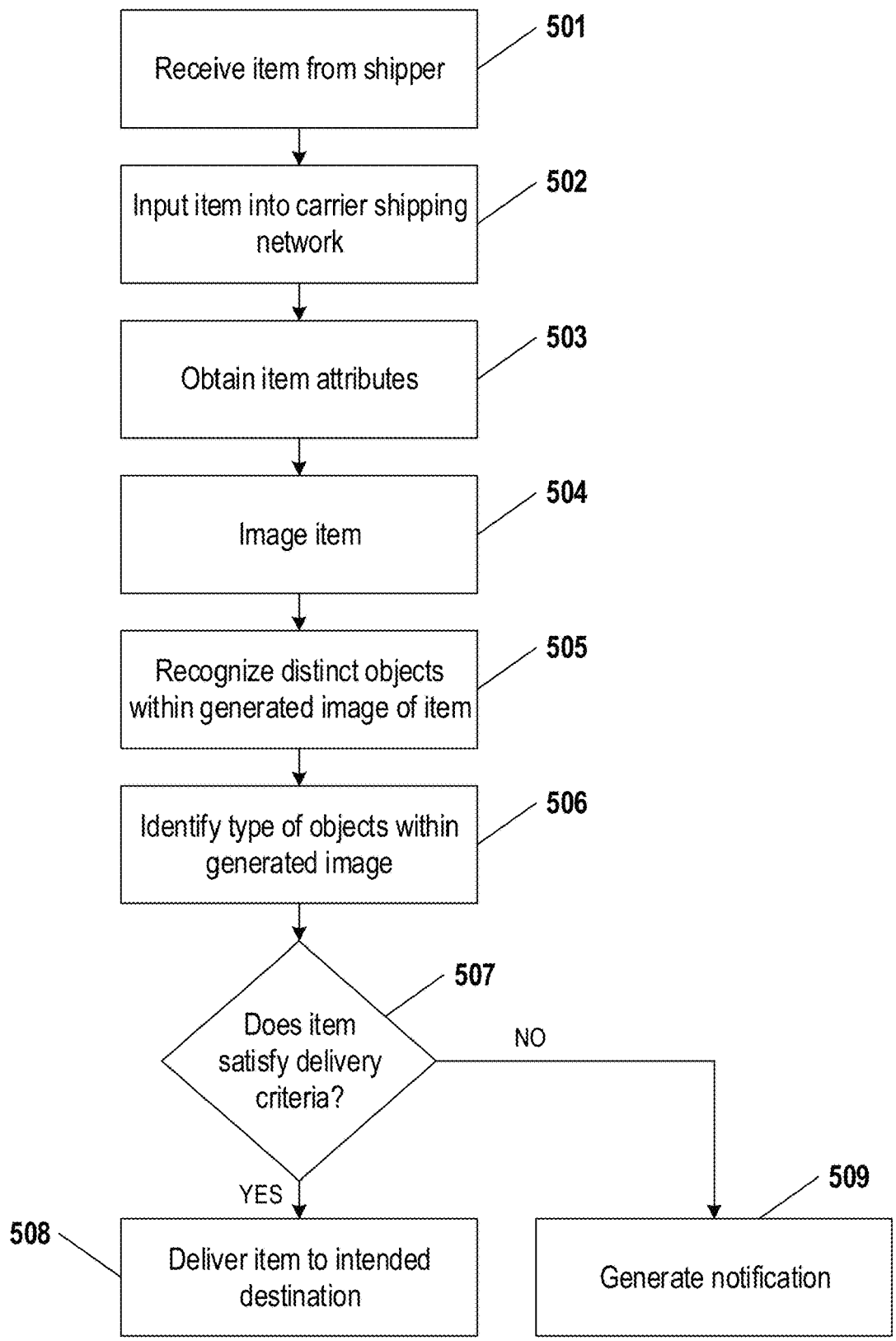
FIG. 5 is an example flowchart illustrating steps for determining whether a shipment satisfies disposition criteria according to one embodiment of the present invention.

Each of the various enhanced review processes may be configured to provide some level of verification of the items contained within a particular shipment. Examples of various enhanced review processes that may be undertaken for various items comprise: obtaining shipment characteristics (e.g., measuring dimensions of a shipment and/or weighing a shipment), imaging a shipment, detecting one or more items within a shipment based on a generated image of the shipment, identifying one or more of the detected items present within the shipment by comparing portions of a generated image against one or more reference images associated with item descriptions, and/or the like. A detailed description of certain of these enhanced review processes is included herein, and a flowchart illustrating various steps for completing a review of a shipment 10 is included as FIG. 5. As discussed herein, various steps illustrated in the flowchart of FIG. 5 are optional, and may be undertaken based on an applicable review procedure for a particular shipment.

For example, various shipments may not be subject to any enhanced review processes as discussed herein. In various embodiments, the shipment profiles corresponding to such shipments 10 may indicate that the shipments 10 are not subject to any review procedure, and accordingly such shipments 10 may not be reviewed between receipt of the shipment 10 and delivery of the shipment 10 to an intended destination. Accordingly, with reference to FIG. 5, such shipments 10 may be received from a shipper at step 501 and inputted into a carrier's transportation network at step 502. The shipments 10 may then be transported through the carrier's transportation network and delivered to an intended destination at step 508.

As yet another example, a first review procedure may comprise weighing the shipment 10 to determine whether the shipment 10 has a weight substantially equal to an expected weight (e.g., provided by a shipper, determined based on the sum of the weights of each item included in a list of items expected within the shipment, and/or the like). Again with reference to FIG. 5, shipments 10 subject to a first review procedure may be received from a shipper at step 501 and inputted into a carrier's transportation network at step 502. One or more shipment attributes may be obtained for the shipment 10 at step 503 (e.g., dimensions of the shipment 10 and/or a weight of the shipment 10). In various embodiments, the one or more shipment attributes may be utilized to determine whether the shipment 10 satisfies applicable disposition criteria (e.g., whether the weight of the shipment 10 satisfies an expected weight of the shipment, based on the expected contents of the shipment) at step 507. In various embodiments, the disposition criteria may comprise a target weight and a tolerance element for determining whether the shipment 10 satisfies the disposition criteria. For example, the disposition criteria may indicate that a shipment 10 should weigh 210 pounds, with a tolerance of 25 pounds (e.g., to provide for potential differences in packaging material weight). In various embodiments, the tolerance element may be determined based on one or more characteristics of the shipment 10 (e.g., the insured value of the shipment). The shipments 10 may then be transported through the carrier's transportation network and, upon a determination that the shipments 10 satisfies the applicable disposition criteria, delivered to an intended destination at step 508. Upon a determination that the item 10 does not satisfy the applicable disposition criteria, the carrier server 100 may generate and transmit one or more notifications as described herein (e.g., to the various carrier employees, to the shipper and/or to the intended recipient) and illustrated at step 509. In various embodiments, the carrier may ultimately dispense of the shipment 10, as described herein after generating and transmitting the one or more notifications. For example, the carrier may dispense of a shipment 10 according to instructions for a shipper, consignee, and/or third-party entity, by disposing of one or more items within the shipment 10, by returning the shipment to the shipper, by transporting the shipment to a third-party entity, by opening the shipment 10 to further investigate the contents thereof, by donating one or more items of the shipment 10 to charity, and/or the like.

A second review procedure may comprise imaging the shipment 10 one or more times during transportation from the origin to the destination. In various embodiments, the second review procedure may additionally comprise methodologies for detecting one or more items within the shipment 10. In various embodiments, detecting each individual items within the shipment 10 may enable a determination of whether the detected number of items is at least substantially equal to the expected number of items (e.g., as provided by the shipper and/or as determined based on a review of a list of items present within the shipment). Moreover, as discussed herein, each generated image may be stored in association with a corresponding shipment profile, and the stored images may be utilized to determine whether any changes to the contents of a particular shipment 10 occurred during shipment. For example, a shipment 10 may be imaged a plurality of times during transit from the origin to the destination (e.g., immediately after ingestion into the carrier's shipping network and immediately prior to final delivery of the shipment to the destination location) in order to determine whether any changes (e.g., damage and/or tampering) have occurred to the contents of the shipment 10. In various embodiments, the second review procedure may additionally comprise weighing the shipment one or more times throughout the shipment process.

With reference to FIG. 5, shipments subject to a second review procedure may be received from a shipper at step 501 and inputted into a carrier's transportation network at step 502. One or more shipment attributes may be obtained for the shipment 10 at step 503 (e.g., dimensions of the shipment 10 and/or a weight of the shipment 10). The shipment may then be imaged at step 504, and the carrier server 100 may then analyze the generated image to detect various distinct items at step 505, and as described in detail herein. In various embodiments, the imaging and analysis steps 504-505 may be repeated one or more times during the transportation process. In various embodiments, the shipment attributes and/or the generated images may be utilized to determine whether the shipment satisfies applicable disposition criteria (e.g., whether the weight of the shipment 10 satisfies an expected weight of the shipment, based on the expected contents of the shipment and/or whether the detected number of items within the shipment satisfies the expected number of items) at step 507. In various embodiments, the disposition criteria may comprise a tolerance element for determining whether the shipment 10 satisfies the disposition criteria. For example, the disposition criteria may indicate that the detected number of items within the shipment 10 must be determined to remain constant throughout the shipping process, with a tolerance of ±2 items. In various embodiments, the tolerance element may be determined based on one or more characteristics of the shipment 10 (e.g., the insured value of the shipment). The shipment 10 may then be transported through the carrier's transportation network and, upon a determination that the shipment 10 satisfies the applicable disposition criteria, delivered to an intended destination at step 508. Upon a determination that the shipment 10 does not satisfy the applicable disposition criteria, the carrier server 100 may generate and transmit one or more notifications as described herein (e.g., to the various carrier employees, to the shipper and/or to the intended recipient) and illustrated at step 509. In various embodiments, the carrier may ultimately dispense of the shipment 10, as described herein after generating and transmitting the one or more notifications.

An example third review procedure may comprise steps for imaging a shipment and detecting various individual items present within the shipment, as discussed in reference to the second review procedure, as well as comparing various portions of the generated image against a plurality of reference images to determine the identity of a type of item positioned within the shipment based on determined similarities and/or matches between the generated image and one or more of the reference images. As discussed herein, the reference images may be provided by the shipper and/or they may be part of a database of reference images accessible by the carrier server 100. In the former embodiment in which the reference images are provided by the shipper for a particular shipment 10, a comparison between the generated image and the provided reference images may be indicative of whether the items within the shipment are those that are expected to be present therein. In the latter embodiment in which the reference images are stored in a database of reference images, the comparison between the generated image and the reference images may be utilized to determine an identity of the various types of items present within the shipment.

With reference to FIG. 5, shipments subject to a third review procedure may be received from a shipper at step 501 and inputted into a carrier's transportation network at step 502. One or more shipment attributes may be obtained for the shipment 10 at step 503 (e.g., dimensions of the shipment 10 and/or a weight of the shipment 10). The shipment may then be imaged at step 504, and the carrier server 100 may then analyze the generated image to detect various distinct items at step 505, and as described in detail herein. In various embodiments, the imaging and analysis steps 504-505 may be repeated one or more times during the transportation process. In various embodiments, the detected items may be compared against one or more reference images to determine the identity of each of the detected items at step 506. In various embodiments, the shipment attributes and/or the generated images (including the determined identity of the various items identified within the shipment) may be utilized to determine whether the shipment satisfies applicable disposition criteria (e.g., whether the weight of the shipment 10 satisfies an expected weight of the shipment, based on the expected contents of the shipment; whether the detected number of items within the shipment satisfies the expected number of items, and/or whether the identity of the detected items satisfies an expected content of the shipment) at step 507. In various embodiments, the disposition criteria may comprise a tolerance element indicative of an acceptable amount of variation between the identity of the items detected within the shipment 10 and the listing of expected items to be present within the shipment 10. For example, the disposition criteria may indicate that the identity of each detected item must match with an item included in the list of expected items, and that each item included in the list of expected item must be located within the shipment. However, the tolerance element may indicate that one extra item not included in the listing of expected items is acceptable and/or two items listed on the list of expected items need not be detected. Such tolerance may account for potential free giveaways from various shippers that are not included in a list of expected items (e.g., an itemized invoice, a financing document, an insurance claim form, and/or the like) and/or for the possibility that certain items present within the shipment may not be detected by the scanning device. In various embodiments, the tolerance element may be determined based on one more attributes of the shipment (e.g., the weight of the shipment, the identity of the shipper, and/or the like).

The shipment 10 may then be transported through the carrier's transportation network and, upon a determination that the shipment 10 satisfies the applicable disposition criteria, delivered to an intended destination at step 508. Upon a determination that the shipment 10 does not satisfy the applicable disposition criteria, the carrier server 100 may generate and transmit one or more notifications as described herein (e.g., to the various carrier employees, to the shipper and/or to the intended recipient) and illustrated at step 509. In various embodiments, the carrier may ultimately dispense of the shipment 10, as described herein after generating and transmitting the one or more notifications.

Various combinations of the enhanced review processes described herein may be provided for a particular review procedure.

a. Imaging a Shipment

Once a shipment is ingested into a carrier's transportation network, the shipment may be imaged to generate an image of an interior of the shipment. For example, the shipment may be imaged using an X-ray imaging device as described herein, a millimeter wave imaging device, a CT imaging device, an MRI imaging device, and/or the like. In various embodiments, images generated as a result of imaging a shipment may be stored in a shipment profile associated with the imaged shipment.

In various embodiments, imaging signals 145 (e.g., X-ray radiation) may be emitted from the imaging emitter 142 and received by a detector 143 as illustrated in FIG. 4A. Although illustrated as a single component, the detector 143 may comprise a detector array comprising multiple detectors each configured for receiving imaging signals and converting the received imaging signals into image data corresponding to various attributes of the received signals. Moreover, although the shown configuration of FIG. 4A includes an imaging emitter 142 positioned above a package 10 and a detector 143 positioned below a package, it should be understood that the imaging emitter 142 and detector 143 may be oriented at other angles with respect to the package 10. For example, the imaging emitter 142 may be positioned on one lateral side of a package 10 and the detector 143 may be positioned opposite the package 10 on the second lateral side. As yet another example, the imaging emitter 142 may be positioned at an angle relative to the package (e.g., aligned with a top corner of the package 10) and the detector 143 may be positioned opposite the imaging emitter 142 (e.g., aligned with a bottom corner opposite the imaging emitter 142). In such embodiments, the imaging emitter 142 and detector 143 may be oriented on opposite sides of a package 10 such that imaging signals 145 are directed from the imaging emitter 142, through the package 10, and to the detector 143. In various embodiments, two or more imaging emitter 142 and detector 143 pairs may be utilized, each emitter/detector pair configured to direct imaging signals 145 through the package 10 at a different orientation.

Thus, the imaging device 140 may be configured to image one or more shipments 10 while the shipment is being propelled by the conveying mechanism 141. Although illustrated as a conveyor belt, the conveying mechanism may comprise any of a plurality of conveying mechanisms, such as, for example, a slide, chute, bottle conveyor, open or enclosed track conveyor, I-beam conveyor, cleated conveyor, and/or the like. Moreover, as illustrated in FIG. 5A, the shipment may be imaged together with a penetration grid 150 that may be configured to provide an indication of whether the shipment has been completely imaged. For example, the penetration grid may comprise a plurality of radiopaque grid members that may be visible in a resulting X-ray image if the shipment is fully imaged.

FIG. 4B illustrates an exemplary generated image 600 of the shipment 10 being imaged. As illustrated therein, at least a portion of a grid or mesh structure of the penetration grid 150 located directly adjacent (e.g., above or below) the shipment 10 being imaged is still visible in the visual display 600. However, if a particularly dense item is contained within the shipment 10, the portion of grid or mesh structure located adjacent the dense item would not be visible in the visible display 600.

The conveying mechanism 141 may be configured to propel a shipment 10 at a velocity such that the imaging device 140 may record multiple images of each shipment while the shipment is within the imaging device. As a non-limiting example, the imaging device 140 may be configured to image a plurality of slices of each shipment 10. Each successive slice may be at least substantially perpendicular to the direction of travel, and may be imaged as a portion of the shipment 10 is propelled through an imaging area. In various embodiments, the conveying mechanism 141 may operate continuously at a particular velocity, or it may be configured to temporarily stop moving while the imaging device 140 images each shipment 10. While the shipment 10 is located within the imaging device 140, the imaging emitter 142 emits imaging signals 145 through the shipment 10. In various embodiments, the imaging emitter 142 may be operating constantly while the imaging device 140 is operating, such that the imaging emitter 142 emits pulses of imaging signals to create images at least periodically (e.g., every 10 seconds, every 5 seconds, every second, every 500 milliseconds, every 250 milliseconds, every 100 milliseconds, every 10 milliseconds, and/or the like).

The imaging signals 145 emitted by the imaging emitter 142 is received by the detector 143 and the detector 143 determines the relative intensity of the imaging signals 145 received at each of a plurality of locations on the surface of the detector 143. The relative intensity of the imaging signals 145 received at each of the plurality of locations may be indicative of the location of various items having differing densities within the shipment 10. As discussed herein, in embodiments utilizing a penetration grid 150, the grid members of the penetration grid may be radiopaque, such that the detector 143 may detect a negligible or nonexistent intensity of imaging signals 145 at locations corresponding to the grid members. As a result, the relative intensity of the imaging signals 145 received by the detector 143 may be indicative of a radiopaque grid or mesh structure in addition to any imaging signals passed through the spaces in the grid or mesh structure of the penetration grid.

In various embodiments, image data indicative of the relative intensity of the imaging signals 145 received by the detector 143 is generated. In various embodiments, the image data may be transmitted via one or more networks 105 to the carrier server 100, and/or one or more user computing entities 110. The image data may be utilized to generate an image of the interior of the imaged shipment. Accordingly, the resulting image may provide an indication of the relative location of various items within the shipment 10. Such image may thus be utilized, for example, to detect the edges of various items contained within the shipment.

As discussed herein, each shipment may be imaged one or more times during the transportation process between an origin and a destination. For example, a carrier may image one or more shipments immediately after accepting the shipment into the carrier's transportation network. For example, a shipment may be imaged at a receipt location (e.g., a carrier location at which the shipper provides the shipment to the shipper), at one or more shipping hubs operated by the carrier, at one or more airports, at one or more international ports, and/or the like. Images generated during each image may be stored in the shipment profile, as described herein.

b. Item Detection

As discussed herein, upon generating an image of an interior of a shipment 10, the presence of various items may be detected within the generated image. For example, as discussed above, images generated during an imaging process of a shipment 10 may provide data indicative of the relative densities of items positioned within the shipment 10. Accordingly, one or more edge detection methodologies may be utilized to distinguish the edges of various items positioned within the shipment 10 in order to detect each of a variety of items positioned within the shipment 10. Such edge detection methodologies may comprise steps for analyzing the generated images to determine where the edges of a particular item, as reflected in the generated image, are located in order to detect distinct items reflected in the generated image. Such methodologies may comprise steps for analyzing the generated images on a pixel-by-pixel level in order to identify differences in pixel color in adjacent pixels. Upon a determination that adjacent pixels vary in color by a predetermined threshold, the border between the adjacent pixels may be determined to correspond with the border of an item within the shipment 10. As a non-limiting example, the difference in color between adjacent pixels may be determined based on a comparison of RGB color values associated with each pixel.

As another example, particularly for shipments 10 containing a plurality of items having similar densities, the detection of various items may comprise steps for identifying repeated edge shapes in order to estimate the presence of multiple items having similar densities. For example, as discussed herein, various embodiments may comprise steps for identifying an edge of an item (e.g., by comparing the color of adjacent pixels in a generated image) and determining whether one or more edge shapes are repeated within the generated image. For example, the identification of a plurality of ball bearings within the shipment may be identified based on a determination that a generally round edge shape is repeated a plurality of times in the generated image. Accordingly, a quantity of items contained within the shipment may be estimated based on the generated image.

In various embodiments, data indicative of the detection of various items within a generated image may be stored in association with the corresponding shipment profile. In various embodiments, data indicative of the determined shape of the items, the determined (e.g., estimated) density of the items, the quantity of detected items, and/or the like may be stored in association with the shipment profile.

Moreover, in various embodiments, imaging a shipment 10 may comprise physically unpacking and repacking the shipment 10. During the process of unpacking and repacking the shipment 10, one or more images (e.g., photographs) may be generated of various items within the shipment 10. Such images may thereafter be stored in association with a shipment profile corresponding to the shipment 10.

c. Item Identification

Upon detecting one or more items within the shipment 10, and detecting the individuality of each item as separate and distinct, the system may determine the identity of each individual item (e.g., the type of item).

In various embodiments, the carrier server 100 may be configured to compare the images of the one or more items generated during the imaging process of the shipment 10 against one or more reference images. In various embodiments, the reference images may comprise images provided by the shipper and stored in association with the corresponding shipment profile. In certain embodiments, the reference images may be stored in one or more databases accessible to the carrier server 100. In such embodiments, the reference images may comprise a plurality of images of a plurality of items stored in the database. Such images may comprise images generated using a variety of imaging methodologies (e.g., photograph, X-ray, millimeter wave, CT image, MRI image, and/or the like), and may be associated with a description of the imaged item type present in the image. For example, the reference images may comprise images of a baseball bat taken utilizing general photography, x-ray, millimeter wave, and CT imaging technologies. Each of these images may be associated with an item description of "baseball bat." The item description may comprise one or more components, such as a general title (e.g., "baseball bat") and/or one or more additional descriptors (e.g., an adult sized wooden baseball bat"). In various embodiments, the reference images may comprise a plurality of images of various items taken from various perspectives. For example, the reference images may comprise top-view, side-view, front-view, back-view, bottom-view, and/or the like images of each of a variety of items. These reference images may each be stored in association with one or more item descriptions.

In various embodiments, the reference images may be stored in a privately accessible database in communication with the carrier server 100, and/or a publicly available database accessible to the carrier server 100. For example, a privately accessible database may comprise reference images generated by the carrier during imaging processes of historical shipments 10. In such embodiments, the database of reference images may be updated by the carrier server 100 to include additional images upon receipt of new images generated during imaging processes of various shipments 10.

In various embodiments, a publicly accessible database of reference images may comprise a plurality of publicly available images and associated descriptions of items illustrated in the corresponding images. As a non-limiting example, images made publicly available through Google® Images may be utilized as reference images in various embodiments. As yet another example, images provided through a website provided by a shipper, for example, images provided on product information pages of a merchant's online website, may be utilized as reference images in various embodiments.

In various embodiments, the identification of various items contained within a shipment 10 may comprise steps for comparing images generated during an imaging process of the shipment 10 against the plurality of reference images to determine whether there is a match between the generated image and one or more images stored as reference images. For example, image comparison techniques may be utilized to identify similar image attributes (e.g., the location and/or size of one or more specifically colored portions of the image) between the generated image and one or more of the reference images. For example, the overall shape of an item, as reflective by a determined outline of the item (e.g., identified based on edge detection of the item, as described herein) may be compared against the overall shape of items pictured in reference images (e.g., identified based on edge detection of the item, as described herein) to determine similarities therebetween. The identification of matching reference images may be based on a fuzzy-logic, and/or confidence level comparison between images. For example, one or more attributes of a generated image may be determined to match corresponding attributes within one or more reference images. The relative number of matching image attributes (e.g., the overall number of matching attributes, and/or the number of matching attributes relative to the total number of possible matching attributes) may be utilized to determine whether a particular reference image corresponds to the generated image. In various embodiments, an identification of a closest match between the generated image and one of the reference images may be determined based on a comparison between the number of matching image attributes. In various embodiments, the number of matching attributes (e.g., the total number of matching attributes or the number of matching attributes relative to a total number of possible matches) may be compared against a confidence threshold to determine whether the identified matching reference image is reflective of at least one item within the shipment. Upon a determination that the match between the generated image and the identified reference image satisfies a confidence threshold, the carrier server 100 may be configured to associate the item description corresponding to the identified reference image with the generated image. The identified item description may thereafter be associated with the shipment profile for the corresponding shipment.

In various embodiments, the confidence threshold may be configurable for each individual shipment 10. Accordingly, the confidence threshold utilized to determine a match between a generated image and a reference image for a determined high-risk and/or high-value shipment may require a higher level of match than a low-risk and/or low-value shipment. For example, the confidence threshold may be based on one or more attributes of the shipment (e.g., expected content, insured value, and/or the like), one or more attributes of the shipper, the destination location, and/or the like (e.g., a determination that a destination location is considered a high-risk destination location). As yet another example, the confidence threshold may be determined for a particular shipment based on a difference between an expected weight of the shipment 10 and a measured weight of the shipment 10. For example, a high correlation between an expected weight (e.g., as provided by a shipper and/or as determined by the carrier server 100 based on a determined expected weight of the items included in a listing of the contents of the shipment) and measured weight may be indicative of a high likelihood that the actual contents of the shipment match the expected contents. As a specific example, if the actual weight of a shipment is within an expected weight range of the shipment (considering, for example, potential differences in weights of packaging materials), then the confidence threshold may be lower than a shipment for which the expected weight of the shipment is not within the expected weight range of the shipment.

In various embodiments, upon a determination that no reference images are located that satisfy the confidence threshold, the carrier server 100 may be configured to generate one or more alerts to be transmitted to one or more users (e.g., by transmitting the alert to one or more user computing entities 110).

Figure 6:
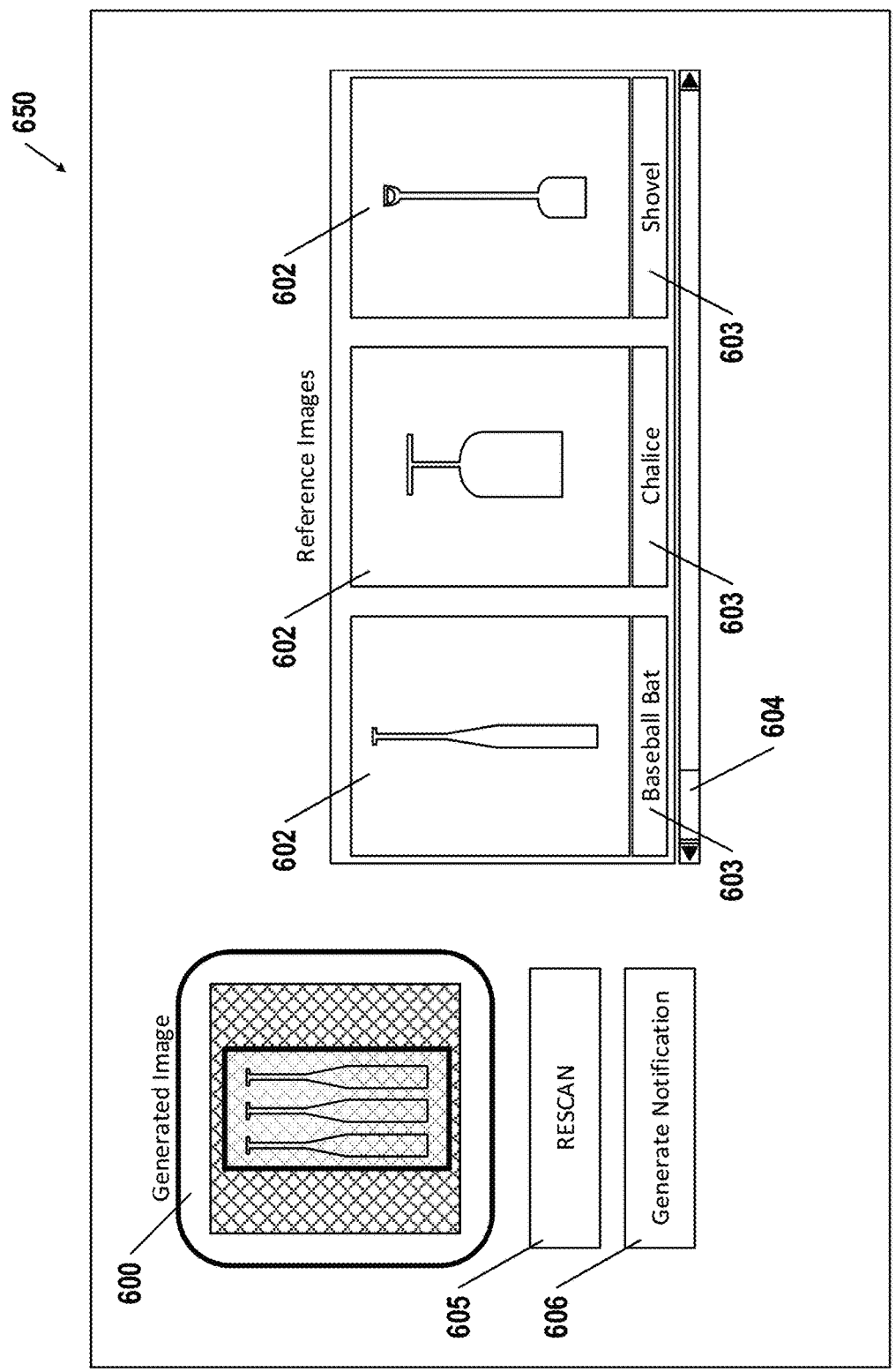
FIG. 6 is an example graphical user interface generated by a carrier server according to one embodiment of the present invention.

In various embodiments, the one or more alerts may cause the receiving user computing entity 110 to initiate a graphical user interface (such as the example graphical user interface shown in FIG. 6) providing the user with information regarding the failed match between the generated image and the reference images, and requesting user input regarding a proposed disposition of the shipments. For example, the graphical user interface 650 may retrieve the generated image 600 as well as a plurality of reference images 602 determined to be close-matches with the generated image. For example, although no individual reference image satisfied the confidence threshold for providing an automatic match with the generated image, the closest matches (e.g., the 3 closest matches) may be retrieved and included in the graphical user interface 650 together with an item description 603 associated with the reference images. The graphical user interface 650 may additionally request the user to provide user input indicating whether the generated image matches any of the determined similar reference images (e.g., by selecting a particular reference image displayed on the graphical user interface). In various embodiments, the graphical user interface 650 may comprise a scroll function 604 configured to cause the graphical user interface 650 to provide new determined similar images (e.g., the graphical user interface 650 may permit the user to scroll through the list of determined similar reference images, for example, beginning with the determined most-similar images, and progressing through the progressively less similar images).

Moreover, the graphical user interface 650 may be configured to enable a user to provide user input indicating that the shipment is to be imaged again utilizing a different orientation (e.g., a different orientation relative to various components of the imaging device). For example, the graphical user interface 650 may comprise a "rescan" button 605. In various embodiments, upon receipt of data indicating the rescan button 605 has been selected by a user, the carrier server 100 may be configured to generate a signal to be sent to an imaging device 140 instructing the imaging device to re-image the package 10. In various embodiments, the imaging device 140 may comprise one or more components configured to rotate an item to a new orientation (e.g., one or more paddles configured to rotate the shipment) and/or one or more components configured to recirculate the shipment for an additional image (e.g., one or more conveying mechanisms configured to move the shipment to the entrance of the imaging device). The imaging, item detection, and item identification processes may then be repeated.

The graphical user interface 650 may additionally be configured to receive user input requesting that a notification is generated and sent to one or more additional computing entities (e.g., associated with a shipper and/or an intended recipient). For example, the graphical user interface 650 may comprise a "Generate Notification" button 606. The graphical user interface 650 may enable notification of various entities upon a determination that the user is unable to ascertain the contents of the shipment 10. Accordingly, the notification may request that one or more parties provide approval that the image is indicative of the correct contents of the shipment 10, and/or may request that the one or more parties provide additional information regarding the contents of the shipment 10. For example, the notification may comprise one or more of the generated images for the shipment 10, and may additionally comprise a listing of expected contents of the shipment 10 (if applicable). As discussed herein, the carrier server 100 may be configured to instruct the carrier to refrain from delivering the shipment 10 until receipt of additional information and/or final approval from the shipper and/or the recipient. In various embodiments, the requested additional information may comprise information identifying one or more of the expected items within the generated image, identifying one or more items appearing within the generated image that does not appear to correspond to any of the expected items, and/or the like.

Moreover, the notification to be provided to the shipper and/or the recipient may request approval for final delivery of the shipment, even though the carrier server 100 and/or carrier employees are unable to identify various expected items within the shipment. In certain embodiments, the notification may additionally comprise a waiver of various rights to raise insurance loss claims should the shipper and/or recipient approve final delivery. For example, the carrier server 100 and/or the carrier employees may be unable to identify one or more items within the shipment because those items may have broken (e.g., a fragile vase may have shattered, thus rendering the vase unrecognizable in the generated image), and/or because the one or more expected items were mistakenly left out of the shipment during initial packaging. In such instances, the notification may indicate that, upon providing final delivery approval, the shipper and/or the recipient may waive certain rights to file a claim for damages to the items and/or for lost items.

In order to increase the processing speed of the comparison between the generated image and the reference images, the generated image may be associated with data identifying the imaging technique utilized to generate the image, and each of the reference images may likewise be associated with data identifying the imaging technique utilized to generate the corresponding reference images. In such embodiments, the comparison between the generated image and the reference images may comprise a comparison between the generated image and the reference images generated utilizing the same imaging technique as the reference image.

Moreover, the possible number of reference images may be minimized by determining a subset of reference images that are likely to correspond to the items contained within the shipment based on a comparison between a listing of items expected to be within the shipment and the item descriptions corresponding to the various reference images. In such embodiments, identifying reference images corresponding to the expected items within the shipment enables a comparison between generated images of the shipment and reference images corresponding to the expected content in order to determine whether the shipment contains the expected content. For example, various reference images may be associated with one or more item descriptions, key words, and/or the like. The listing of expected contents of the shipment (e.g., a shipping manifest) may be compared against the plurality of item descriptions, key words, and/or the like to identify matches therebetween (e.g., a word found in the listing of expected contents being the same as an item description, key word, and/or the like). Any of a variety of word-based search algorithms may be utilized in this regard.

5. Disposition of Shipment

After performing the applicable one or more enhanced review processes for a shipment, the carrier server 100 may be configured to determine the appropriate disposition for the shipment based on one or more disposition criteria. For those shipments not subject to any review procedures, the carrier server 100 may be configured to indicate that the shipment is to be delivered to its intended final destination location.

For those shipments subject to some review procedure, the carrier server 100 may be configured to determine whether the shipment satisfies disposition criteria prior to indicating that the shipment 10 should be delivered to the final destination location. The disposition criteria may be determined based at least in part on the enhanced review processes to be applied to the shipment 10. For example, the disposition criteria for a shipment 10 subject to a weight analysis may be that the weight of the shipment 10 substantially matches an expected weight, and/or that the weight of the shipment 10 does not substantially change during the transportation process from the origin to the destination (e.g., by comparing a weight of the shipment recorded immediately after the carrier ingests the shipment into the carrier's transportation network and a weight recorded immediately before the carrier delivers the shipment to an intended destination location).

For shipments 10 subject to imaging and the detection various items present within the shipment 10, the disposition criteria may require that the number of items identified as present within the shipment does not change during the transportation process (e.g., by comparing a number of items within the shipment 10 as determined based on an image taken immediately after the carrier ingests the shipment 10 into carrier's transportation network and a number of items within the shipment 10 as determined based on an image taken immediately prior to delivering the shipment 10 to an intended destination location. Moreover, in various embodiments, the disposition criteria may require that the determined edges of the items identified during an intake imaging process substantially matches the item edges identified during a final delivery imaging process. Such determination may ensure that no damage occurred to items during the shipping process.

For shipments subject to imaging and item identification, the disposition criteria may require that the identity of the items determined to be present within the shipment 10 match a corresponding list of items expected to be present within the shipment 10. In such embodiments, the disposition criteria may be associated with a confidence threshold for determining whether the identity of items determined to be present within the shipment 10 substantially match the list of expected items for the corresponding shipment 10.

Upon a determination that the shipments 10 satisfy the corresponding disposition criteria, the carrier server 100 may be configured to provide an indication that the shipment 10 is to be delivered to the respective destination location. In various embodiments, the carrier server 100 may be configured to update the shipment profile to reflect that the carrier server 100 approves of final delivery of the shipment 10.

In various embodiments, the carrier server 100 may be configured to generate one or more notifications to be provided to various computing entities. For example, the carrier server 100 may be configured to generate a notification to be sent to a shipper (e.g., a shipper computing entity), a recipient (e.g., a recipient computing entity), one or more carrier users (e.g., a user computing entity 110), and/or the like. The notification may provide an indication that the shipment 10 is approved for final delivery. The notification may additionally comprise additional data regarding the shipment 10, such as a determined contents of the shipment 10 (if applicable), one or more generated images, data identifying the enhanced review processes undertaken for the shipment, and/or the like.

However, upon a determination that the shipment 10 does not satisfy the applicable disposition criteria, the carrier server 100 may provide an indication that the shipment 10 should not be delivered to the final destination location, and instead should be dispensed according to one or more alternative methodologies. For example, the shipment 10 may be held by the carrier until receiving final disposition instructions from a shipper, recipient, and/or the like; or the carrier may redirect the shipment 10 to an alternative delivery location, such as by redirecting the shipment 10 to the shipper location.

Moreover, upon a determination that the shipment 10 does not satisfy the applicable disposition criteria, the carrier server 100 may be configured to generate one or more notifications to be provided to various computing entities. For example, the carrier server 100 may be configured to generate a notification to be sent to a shipper (e.g., a shipper computing entity), a recipient (e.g., a recipient computing entity), a third-party entity (e.g., an insurance provider), one or more carrier users (e.g., a user computing entity 110), and/or the like. The notification may provide an indication that the shipment 10 is not approved for final delivery. The notification may additionally comprise additional data regarding the shipment 10, such as a determined contents of the shipment 10 (if applicable), one or more generated images, data identifying the enhanced review processes undertaken for the shipment 10, and/or the like. The notification may additionally request that a user contact the carrier (e.g., by providing user input in response to receipt of the notification) providing disposition instructions for the shipment 10.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this description. Although specific terms are employed herein, they are used in a generic and descriptive sense only and not for purposes of limitation.

That which is claimed:

1. A system for verifying content of shipments, the system comprising:
   an imaging device comprising an imaging emitter and a detector, the imaging emitter configured to periodically emit imaging signals through a shipment package, and the detector configured to determine relative intensities of the periodically emitted imaging signals to generate image data resulting in at least one captured image of an interior of the shipment package without opening/unpacking the shipment package, wherein the shipment package contains one or more items, and wherein each item of the one or more items in the shipment package is detected as a separate and distinct item;
   a conveying mechanism configured to move the shipment package through the imaging device, wherein the conveying mechanism extends between the imaging emitter and the detector;
   a reference image database that stores a plurality of reference images of a plurality of item types, wherein each reference image of the plurality of reference images is associated with an item description; and
   a carrier computing entity comprising one or more memory storage areas comprising computer executable instruction for implementing a computer implemented method, and one or more processors configured for executing the computer implemented method, the computer implemented method comprising the steps of:
      analyzing a shipment data associated with the shipment package, wherein the shipment data is indicative of an expected content of the shipment package, wherein the expected content of the shipment package is classifiable under one or more item types of the plurality of item types in the reference image database;
      retrieving from the reference image database, one or more reference images based on the shipment data;
      analyzing the image data comprising the at least one captured image of the interior of the shipment package to detect the one or more items represented in the at least one captured image of the interior of the shipment package;
      comparing the one or more reference images to the at least one captured image of the shipment package;
      determining an identity of the at least one item in the one or more items represented in the at least one captured image by finding a similarity and/or match between the at least one of the one or more reference images and at least one item in the one or more items represented in the at least one captured image of the interior of the shipment package;
      determining whether the item description of the at least one of the one or more reference images matches at least a portion of the shipment data that is indicative of the expected content of the shipment package; and
      generating and displaying a graphical user interface via a graphical display device, wherein the graphical user interface is indicative of whether the at least one item of the one or more items represented in the at least one captured image matches the expected content of the shipment package.

2. The system of claim 1, wherein the shipment data identifies an expected quantity of items within the shipment package; and
   wherein determining whether the one or more items represented in the at least one captured image of the shipment package share similarities and/or match the expected content of the shipment package comprises determining whether a quantity of the one or more items represented in the at least one captured image of the shipment package satisfies the expected quantity of items within the shipment package.

3. The system of claim 1, wherein the graphical user interface displays:
   the at least one captured image of the interior of the shipment package; and
   the one or more reference images and their respective associated item descriptions, wherein the graphical user interface is configured to receive a user input to associate the one or more reference images with the at least one captured image of the interior of the shipment package.

4. The system of claim 1, wherein detecting the one or more items represented in the at least one captured image of the interior of the shipment package comprises detecting edges of each of the one or more items represented in the at least one captured image.

5. The system of claim 1, wherein the one or more processors are further configured to generate a notification indicative of whether the one or more items represented in the at least one captured image match the expected content of the shipment package.

6. The system of claim 1, wherein the shipment data identifies a disposition criteria for determining whether the one or more items represented in the at least one captured image match the expected content of the shipment package.

7. A computer-implemented method for verifying content of shipment packages, the method comprising steps for:
   analyzing, via one or more processors, shipment data corresponding to a shipment package, wherein the shipment data is indicative of an expected content of the shipment package;
   analyzing, via the one or more processors, image data comprising a captured image of an interior of the shipment package captured via an imaging device comprising an imaging emitter and a detector, the imaging device configured to periodically emit imaging signals through the shipment package, and the detector configured to convert the periodically emitted imaging signals to image data resulting in at least one captured image of the interior of the shipment package, without opening/unpacking the shipment package;
   detecting, via the one or more processors, one or more items represented in the captured image of the shipment package, wherein each item of the one or more items represented in the captured image of the interior of the shipment package is detected as a separate and distinct item;
   receiving, via the one or more processors, a plurality of reference images from a reference image database, wherein each reference image in the reference image database is associated with an item description;

determining, via the one or more processors, whether the one or more items detected in the at least one captured image of the interior of the shipment package matches one or more reference images in the plurality of reference images received from the reference image database;

determining an identity of at least one of the one or more items detected in the captured image upon finding a match between the one or more reference images in the plurality of reference images and the at least one item in the one or more items represented in the captured image of the interior of the shipment package;

associating, via the one or more processors, the at least one captured image with the item description associated with the one or more reference images in the plurality of reference images that match the at least one item in the one or more items represented in the at least one captured image of the interior of the shipment package;

based on the item description associated with the one or more reference images in the plurality of reference images that match the at least one item in the one or more items represented in the captured image of the shipment package, determining, via the one or more processors, whether the one or more items represented in the captured image of the shipment package match the expected content of the shipment package; and generating and displaying, via a graphical display device, a graphical user interface indicative of whether the one or more items represented in the captured image of the shipment package match the expected content of the shipment package.

8. The method of claim 7, wherein the shipment data identifies an expected quantity of items within the shipment package; and wherein determining whether the one or more items represented in the captured image match the expected content of the shipment package comprises determining whether a quantity of detected one or more items represented in the captured image of the interior of the shipment package satisfies the expected quantity of items within the shipment package.

9. A system for verifying a content of shipments, the system comprising:

an imaging device comprising an imaging emitter and a detector, the imaging emitter configured to periodically emit imaging signals through a shipment package, and the detector configured to determine relative intensities of the periodically emitted imaging signals to generate image data resulting in a captured image of an interior of the shipment package without opening/unpacking the shipment package;

a reference image database storing a plurality of reference images of one or more item types, wherein each reference image of the plurality of reference images is associated with an item description; and a carrier computing entity comprising one or more memory storage areas, comprising computer executable instructions for implementing a computer implemented method, and one or more processors that are collectively configured to execute the computer implemented method, the computer implemented method comprising the steps of:

analyzing a first image data comprising a first captured image of the interior of the shipment package, wherein the first image data is generated based, at least in part, on output received from the imaging device;

detecting at least one item represented in the first captured image of the interior of the shipment package;

retrieving one or more reference images from the reference image database based on the first image data;

based on an item description associated with the at least one reference image, determining an identity of the at least one item represented in the first captured image of the interior of the shipment package upon finding a match between the at least one item represented in the first captured image of the interior of the shipment package and the at least one reference image;

associating the at least one item represented in the first captured image with the item description associated with the at least one reference image;

receiving a second image data comprising a second captured image of the interior of the shipment package, wherein the second image data is generated based, at least in part, on output from the imaging device after the first image data is generated;

detecting at least one item represented in the second captured image of the interior of the shipment package; and determining whether the at least one item represented in the first captured image of the interior of the shipment package matches the at least one item represented in the second captured image of the interior of the shipment package.

10. The system of claim 9, wherein the carrier computer entity is further configured for determining whether the at least one item represented in the first captured image of the interior of the shipment package matches the at least one item represented in the second captured image of the interior of the shipment package by determining whether a first quantity of items represented in the first captured image of the interior of the shipment package is the same as a second quantity of items represented in the second captured image of the interior of the shipment package.

11. The system of claim 9, wherein the carrier computing entity is further configured for:

comparing the at least one item represented in the second captured image of the interior of the shipment package against the one or more reference images retrieved from the reference image database;

identifying a matching reference image corresponding to at least one item represented in the second captured image of the interior of the shipment package;

associating an item description associated with the matching reference image with the corresponding at least one item represented in the second captured image of the interior of the shipment package; and determining whether the item description of the at least one item represented in the first captured image of the interior of the shipment package is the same as the item description of the at least one item represented in the second captured image of the interior of the shipment package.

12. The system of claim 9, wherein detecting the at least one item represented in the first captured image of the interior of the shipment package is based on detecting first edges of the at least one item represented in the first captured image of the interior of the shipment package and detecting second edges of the at least one item represented in the second captured image of the interior of the shipment package.

13. The system of claim 9, wherein the carrier computing entity is further configured for generating a notification indicative of whether the at least one item represented in the first captured image of the interior of the shipment package matches the at least one item represented in the second captured image of the interior of the shipment package.

14. A computer-implemented method for verifying content of shipment packages, the method comprising the steps for:
analyzing, via one or more processors, first image data comprising a first captured image of an interior of a shipment package, wherein the first captured image is captured via an imaging device comprising an imaging emitter and a detector, the imaging emitter configured to periodically emit imaging signals through the shipment package, and the detector configured to determine relative intensities of the periodically emitted imaging signals to generate first image data resulting in the first captured image of the interior of the shipment package;
detecting, via the one or more processors, at least one item represented in the first captured image;
receiving, via the one or more processors, a plurality of reference images from a reference image database, wherein each reference image in the reference image database is associated with an item description;
determining an identity of the at least one item represented in the first captured image of the interior of the shipment package based on an item description associated with at least one reference image matching the at least one item represented in the first captured image of the interior of the shipment package;
associating, via the one or more processors, the first captured image of the interior of the shipment package with the item description associated with the at least one reference image matching the at least one item represented in the first captured image of the interior of the shipment package;
receiving, via the one or more processors, second image data comprising a second captured image of the interior of the shipment package, wherein the second image data is generated based, at least in part, on output of the imaging device after the first image data is generated;
detecting, via the one or more processors, at least one item represented in the second captured image of the interior of the shipment package; and
determining, via the one or more processors, whether the at least one item represented in the first captured image of the interior of the shipment package matches the at least one item represented in the second captured image of the interior of the shipment package.

15. The system of claim 1, wherein the imaging device captures and generates the image data while the shipment package is being propelled by the conveying mechanism.

16. The method of claim 7, wherein the shipment data identifies a disposition criteria for determining whether the one or more items represented in the captured image of the interior of the shipment package match the expected content of the shipment package.

17. The method of claim 7, wherein detecting the one or more items represented in the captured image comprises detecting edges of each of the one or more items represented in the captured image of the interior of the shipment package.

18. The system of claim 1, wherein a radiopaque structure is provided on the conveying mechanism between the shipment package and the detector, the radiopaque structure configured to provide a baseline indicator of penetration of the imaging signals emitted by the imaging emitter and detected by the detector of the imaging device.

19. The method of claim 14, further comprising:
receiving, via the one or more processors, shipment data corresponding to the shipment package, wherein the shipment data is indicative of an expected content of the shipment package.

20. The method of claim 19, wherein the first shipment data identifies an expected quantity of items within the shipment package; and
wherein determining whether the at least one item represented in the first captured image of the interior of the shipment package matches an expected content of the shipment package comprises determining whether a quantity of the at least one item represented in the first captured image satisfies the expected quantity of items within the shipment package.

* * * * *